United States Patent
Singh (10) Patent No.: US 8,930,402 B1
(45) Date of Patent: Jan. 6, 2015

(54) SYSTEMS AND METHODS FOR AUTOMATIC COLLECTION OF DATA OVER A NETWORK

(75) Inventor: Jaideep Singh, Rockville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2011 days.

(21) Appl. No.: 11/261,703

(22) Filed: Oct. 31, 2005

(51) Int. Cl.
*G06F 7/00* (2006.01)
*G06F 17/30* (2006.01)

(52) U.S. Cl.
USPC .......................................................... 707/784

(58) Field of Classification Search
USPC .................................................. 707/10, 784
See application file for complete search history.

(56) References Cited

U.S. PATENT DOCUMENTS

| | | | |
|---|---|---|---|
| 5,890,154 A | 3/1999 | Hsiao et al. | |
| 5,999,940 A | 12/1999 | Ranger | |
| 6,026,414 A | 2/2000 | Anglin | |
| 6,301,584 B1 | 10/2001 | Ranger | |
| 6,643,650 B1 | 11/2003 | Slaughter et al. | |
| 6,691,116 B1 * | 2/2004 | Bart | 707/10 |
| 6,738,760 B1 * | 5/2004 | Krachman | 707/3 |
| 6,865,728 B1 | 3/2005 | Branson et al. | |
| 6,934,694 B2 | 8/2005 | Jamieson | |
| 6,938,057 B2 | 8/2005 | Gusler et al. | |
| 6,957,234 B1 | 10/2005 | Steinbach | |
| 6,959,326 B1 | 10/2005 | Day et al. | |
| 7,043,482 B1 * | 5/2006 | Vinsonneau | 707/10 |
| 2001/0032205 A1 | 10/2001 | Kubaitis | |
| 2002/0004824 A1 * | 1/2002 | Cuan et al. | 709/208 |
| 2002/0007453 A1 * | 1/2002 | Nemovicher | 713/155 |
| 2002/0069324 A1 * | 6/2002 | Gerasimov et al. | 711/114 |
| 2002/0083085 A1 * | 6/2002 | Davis et al. | 707/204 |
| 2002/0198770 A1 | 12/2002 | Jameson | |
| 2003/0105767 A1 * | 6/2003 | Sonoda et al. | 707/100 |
| 2003/0217068 A1 * | 11/2003 | Fruchtman et al. | 707/101 |
| 2004/0122914 A1 | 6/2004 | Williams | |
| 2004/0193760 A1 * | 9/2004 | Matsunami et al. | 710/36 |
| 2004/0236803 A1 * | 11/2004 | Spiegeleer | 707/204 |
| 2005/0021869 A1 | 1/2005 | Aultman et al. | |
| 2005/0044163 A1 * | 2/2005 | Kitamura et al. | 709/213 |
| 2005/0138090 A1 | 6/2005 | Augenstein et al. | |
| 2005/0165869 A1 | 7/2005 | Huang et al. | |
| 2005/0228836 A1 * | 10/2005 | Bacastow et al. | 707/204 |
| 2005/0289169 A1 * | 12/2005 | Adya et al. | 707/101 |

OTHER PUBLICATIONS

"http://www.pss-systems.com/solutions/index.html" (2 pages).

* cited by examiner

*Primary Examiner* — Fred I Ehichioya
*Assistant Examiner* — Kris Mackes (57) ABSTRACT

In one of many possible embodiments, an automatic data collection system is provided. The exemplary system includes a data collection subsystem communicatively coupled to at least one networked device via a network. The data collection subsystem is configured to receive a request for data stored on the networked device and to automatically collect an unaltered replication of the requested data from the networked device via the network. The unaltered replication of the requested data includes an unaltered replication of metadata associated with the requested data.

16 Claims, 6 Drawing Sheets

SYSTEMS AND METHODS FOR AUTOMATIC COLLECTION OF DATA OVER A NETWORK

BACKGROUND INFORMATION

Computer networks have become valuable resources capable of storing vast amounts of information. Computer networks typically include interconnected devices (e.g., workstations and servers) having data stored thereon. On occasion, users of computer networks copy data from one network device to another. For example, a particular user may copy a file stored on his workstation to a shared network drive. By way of another example, a network administrator may perform a network backup operation by copying files stored on networked devices to a backup data repository.

Unfortunately, existing tools for copying network data are not without shortcomings. For example, many existing tools rely upon significant user intervention and direction. Accordingly, users and administrators often spend considerable time manually copying data between network devices.

Other existing tools attempt to automate data copying operations. However, the extent to which these tools are automated is significantly limited in many situations. For example, network backup tools can copy network data in bulk but are unable to fulfill targeted requests for select data in an automated fashion. Thus, existing tools for copying network data are not proficient for all data copying preferences and situations, especially situations requiring that specific subsets of network data be retrieved.

For example, modern litigation has introduced a need for selectively copying network data in accordance with specific criteria included in discovery requests. Parties to litigation may receive discovery requests requiring the parties to retrieve select information from their respective computer networks. Because of the limitations of existing tools for copying network data, the parties are often forced to dedicate significant man-hours to manually identify and copy the select network data that will satisfy the criteria set forth in discovery requests, without going beyond the scope of the requests. In many cases, information technology ("IT") staff members are required to manually and remotely connect to network machines and copy select data. Not only is this technique time consuming, inaccuracies may be introduced because different IT staff members may use different methodologies to copy data. This creates risks of omitting relevant data or inadvertently altering document metadata, which refers to information about a particular data set that may describe, for example, files dates, sizes, and formats, as well as how, when, and by whom the data set was received, created, accessed, and/or modified. Moreover, many data copying tools are incapable of producing exact copies of data because the metadata (e.g., the creation date and accessed date) associated with the copies is modified from the original when a copy is made.

The manual operations required to fulfill electronic discovery requests are especially taxing for large organizations that operate vast computer networks and/or are involved in multiple or on-going litigations. Moreover, reliance on manual copying operations makes it difficult for organizations to certify strict compliance with legal requirements associated with electronic discovery requests. Without an auditable log of copy operations, it is difficult to prove that copied data is complete and compliant with legal obligations. In addition, manual copying operations tend to result in duplicative efforts being expended to recopy data that is common to overlapping discovery requests.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Preferred embodiments may be implemented as data collection systems and methods. The systems and methods can automatically and selectively identify and retrieve replications of select data stored on networked devices. The data may be retrieved in response to a request (e.g., a discovery request), with the data being identified in accordance with identifiers included in the request. Accordingly, the present systems and methods are capable of automatically collecting select data identified by specific request criteria, thereby saving time and money by minimizing manual data collection tasks. The flexible and robust nature of the systems and methods enables satisfaction of a broad range and variety of request criteria.

The present methods and systems also provide auditable procedures and results. Collection logs may be generated to include information descriptive of data collection events and results. The collection logs provide evidence useful for certifying that a collection of electronic data satisfies request requirements. This is especially useful for demonstrating satisfaction of the requirements of electronic discovery requests associated with litigation or a subpoena, for example. In addition, the systems and methods collect data consistently and accurately using uniform procedures for each network device.

To further enhance compliance with request requirements, the present systems and methods are configured to prevent alterations from being made to the data being collected. Data may be replicated and retrieved in a manner that preserves the metadata and content of the data. This provides an additional level of compliance in certain embodiments by ensuring that unaltered replications of data are collected. Collection logs can verify the unaltered nature of collected data.

Elements and functions of exemplary embodiments of data collection systems and methods will now be described in detail.

II. Exemplary System View

Figure 1:
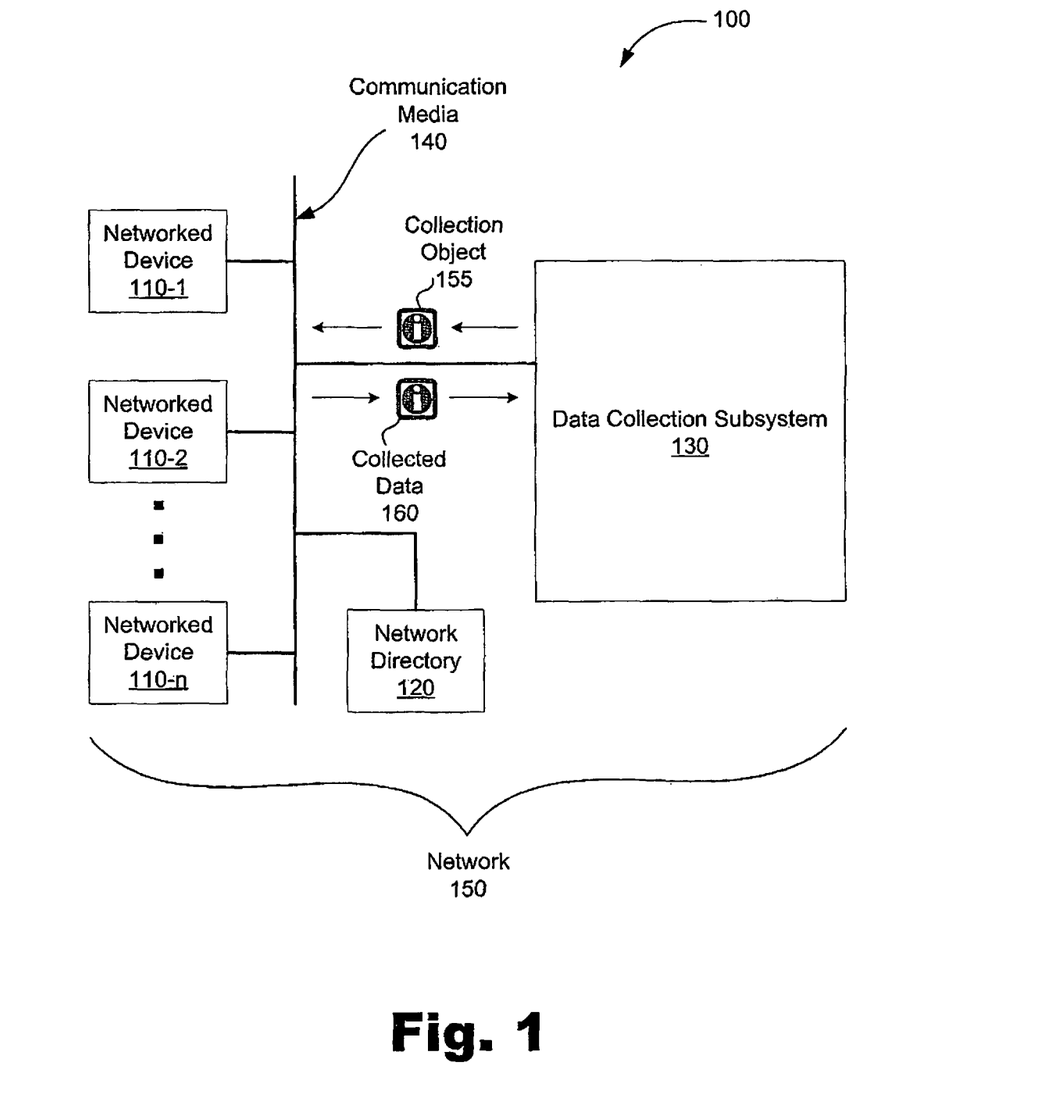
FIG. 1 is a block diagram illustrating an exemplary data collection system, according to an embodiment.

FIG. 1 illustrates an example of an automatic data collection system 100 (or simply "system 100"), according to one embodiment. As shown in FIG. 1, system 100 includes networked devices 110-1 through 110-n (collectively networked devices 110), network directory 120, and data collection subsystem 130 connected together by communication media 140 to form network 150. Data collection subsystem 130 is configured to push collection object 155 onto one or more select networked devices 110. Collection object 155 includes control data, and in some cases instructions (e.g., an executable), for use by the select networked devices 110 to identify and replicate select data stored thereon to generate collected data 160, which is transmitted from the select networked devices 110 to data collection subsystem 130 over network 150

While an exemplary system 100 is shown in FIG. 1, those skilled in the art will recognize that the exemplary components illustrated in the Figure are not intended to be limiting. Indeed, those skilled in the art will recognize that other alternative hardware environments and implementations may be used. Each of the components of system 100 will now be described in additional detail.

A. Networked Devices

Networked devices 110 may include any devices communicatively interconnected by communication media 140 to/from one or more communication networks (e.g., network 150). Networked devices 110 can include, but are not limited to, one or more desktop computers, laptop computers, tablet computers, personal computers, personal data assistants, cellular telephones, satellite pagers, wireless network devices, embedded computers, video phones, network interface cards, mainframe computers, mini-computers, programmable logic devices, vehicles, entertainment devices, gaming devices, music devices, servers, routers, gateways, networked data repositories, mapped network drives, shared drives, and any other devices capable of storing electronic data and communicating over a network. Networked devices 110 can also include various peripherals such as a terminal, keyboard, mouse, screen, printer, stylus, input device, output device, or any other apparatus that can help users interact with the networked devices 110.

B. Communication Media

Communication media 140 may include any medium or media capable of propagating communications between networked devices 110, network directory 120, and data collection subsystem 130 For example, communication media 140 may include, but is not limited to, transmission lines, telephone lines, cable lines, coaxial lines, power lines, buses, copper wires, fiber optic media, wireless media, connectors, plugs, jacks, and any other media capable of communicatively connecting devices together. Communication media 140 can support any communication protocols and technologies employed by networked devices 110, network directory 120, or data collection subsystem 130.

C. Network

Network 150 may include any configuration of devices communicating with one another via communication media 140, including network configurations and topologies known to those skilled in the art. Network 150 may include, but is not limited to, one or more communication networks, network domains, local area networks (LANS), wide area networks (WANS), metropolitan area networks, wireless networks, landline networks, pico-net networks, and proprietary networks. Network 150 may employ any known networking protocols, devices, and technologies, including firewalls, security technologies, access technologies, and permissions technologies, for example.

D. Network Directory

Network directory 120 may be configured to maintain up-to-date information identifying devices connected to and/or logged on network 150. For example, when a user of networked device 110-1 logs on network 150, network directory 120 updates a directory of information to show that networked device 110-1 is currently logged on the network 150. When the user logs off, network directory 120 updates the directory to show that networked device 110-1 is currently logged off of the network 150. The information maintained by network directory 120 is useful for determining when particular networked devices 110 are accessible over the network 150 (e.g., which networked devices 110 are logged on the network 150). As described below, data collection subsystem 130 can connect to logged-on devices and initiate identification and copy operations to retrieve collected data 160 from those devices.

Network directory 120 may include one or more devices connected to networked devices 110 and data collection subsystem 130 by communication media 140 For example, network directory 120 may include one or more servers configured to maintain one or more directories of computer identification information related to networked devices 110 and their users. In certain embodiments, network directory 120 includes one or more domain controllers and/or active directories configured to manage network registration events for every networked device 110 that joins a domain(s) of network 150, which will be understood by those skilled in the art. A domain controller or active directory may be provided for each domain of network 150.

E. Collection Object

Collection object 155 may include one or more objects or other suitable data structures capable of being transmitted over network 150 to networked device 110. Collection object 155 may be placed on, verified that it is valid, and executed (i.e., "dropped on") networked device 110. Collection object 155 may include any data and/or instructions useful by networked device 110 to perform data collection operations, including identifying and replicating select data stored thereon, evaluating and replicating select data on mapped network drives, and transmitting the collected data to data collection subsystem 130. Exemplary data collection operations will be described in detail further below.

Collection object 155 may include one or more identifiers (e.g., date ranges, file types, network addresses) and/or other data useful for collecting select data, including any of the identifiers described further below. The identifiers may be included in one or more configuration files configured to be used by one or more executables capable of operating on networked device to perform data collection operations.

In some cases, the executable(s) may be included in collection object 155 along with associated configuration file(s). For example, for a first-time collection operation on a particular networked device 110, collection object 155 may include one or more executable files and an associated configuration file(s). The executable files and associated configuration files include processor-readable instructions and data configured to direct networked devices 110 to perform specific data collection operations, including, for example, scanning for select data, replicating the data to form collected data 160, and transmitting the collected data 160 to data collection subsystem 130, as described below.

In other cases, the executable(s) may already be included on networked device 110 For example, networked device 110 may include an executable dropped during a previous data collection operation. Subsequent data collection operations on the same networked device 110 may reuse the executable by passing it different sets of parameters. For example, collection object 155 may simply include one or more configuration files having identifiers for use by the executable in collecting data.

F. Collected Data

Collected data 160 may include one or more replications of at least a subset of data stored on or accessible at networked devices 110. Collected data 160 may be in any form suitable for transmission from networked devices 110 to data collection subsystem 130. In certain embodiments, for example, collected data 160 includes one or more electronic files identified by request criteria and packaged for transmission over communication media 140. The files may be encapsulated (i.e., wrapped) in any suitable encapsulation (e.g., data structure or data structures) that protects the files from being altered. "Encapsulate," as used herein, refers broadly to any procedure for generating an unaltered replication of data in a manner that preserves metadata in unaltered form. For example, files may be encapsulated and/or compressed in a preferred embodiment using a packaging and/or compression utility such as those associated with "zip" or "tar" files, which are well-known to those skilled in the art. In certain embodiments, files are encapsulated in a data structure configured to be recognized and processed as a singe entity (e.g., a single zip file). By encapsulating the files, unaltered replications of the target files can be encoded in a manner that does not modify the metadata or the content of the replicated files. In contrast to many existing file-copying tools that modify metadata of a copied file as compared to the metadata of the original file, encapsulating files (e.g., in a zip archive) preserves the integrity of the original data by preventing metadata and content from being modified. Accordingly, collected data 160 can include exact replications of identified, original files. More specifically, unaltered replications of the original data can be extracted from the collected data 160. As used herein, the term "extract" refers to any procedure for unencapsulating the encapsulated data in a manner that preserves the integrity of the encapsulated data, including preserving metadata in unaltered form.

Collected data 160 may also be compressed in size while still preserving the content and the metadata of the data being copied. For example, target files may be encoded by bit streams into a zip archive, which compresses the size of the archived files. The metadata and content of the zipped files are fully recoverable in unaltered form by unzipping the zip archive.

Collected data 160 may further include collection logs (e.g., log files) having data descriptive of the data collection operations performed on networked devices 110. Exemplary collection logs and data will be described further below.

G. Data Collection Subsystem

Data collection subsystem 130 may include any device or combination of devices (e.g., servers) useful for communicating with networked devices 110 and network directory 120 over network 150, including connecting with, dropping collection object 155 on, and retrieving collected data 160 from the networked devices 110 as described below. In many embodiments, data collection subsystem 130 is implemented in one or more computers. Data collection subsystem 130 may include any computer hardware and/or instructions (e.g., software programs), or combinations of software and hardware, helpful for the performance of automatic data collection processes described herein. In particular, it should be understood that data collection subsystem 130 may be implemented on one physical computing device or may be implemented on more than one physical computing device. Accordingly, data collection subsystem 130 may include any one of a number of computing devices known to those skilled in the art, and may employ any of a number of computer operating systems known to those skilled in the art, including, but by no means limited to, known versions and/or varieties of the Microsoft Windows® operating system, the Unix operating system, the Linux operating system, and any suitable operating system known to be used in network environments.

Accordingly, those skilled in the art will recognize that the various processes described herein may be implemented at least in part as instructions executable by one or more computing devices. In general, a processor (e.g., a microprocessor) receives instructions (e.g., from memory, a computer-readable medium, etc) and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
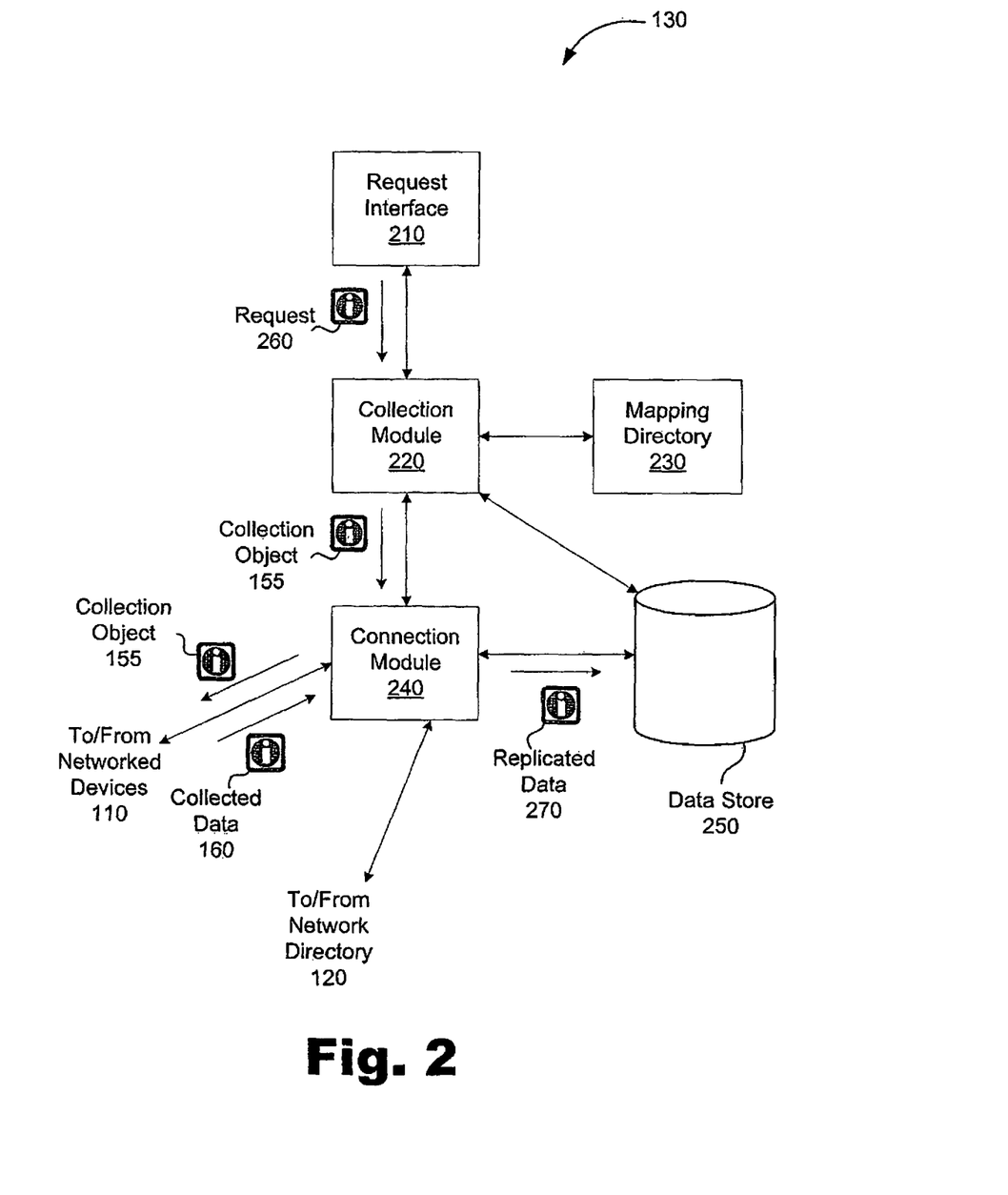
FIG. 2 is a block diagram illustrating an example of the data collection subsystem of FIG. 1, according to an embodiment.

As shown in FIG. 2, data collection subsystem 130 may include request interface 210, collection module 220, mapping directory 230, connection module 240, and data store 250. Request interface 210 is configured to provide request 260 to collection module 220. Collection module 220 is configured to generate collection object 155 based on information included in request 260, mapping directory 230, and optionally data store 250. Collection object 155 is provided to connection module 240, which is configured to monitor network directory 120 to determine logon information for specific networked devices 110 identified by collection object 155. When an identified networked device 110 is logged on network 150, connection module 240 is able to establish a connection with the networked device 110 via communication media 140. Connection module 240 is configured to transmit and drop collection object 155 on the networked device 110. As described in detail below, collection object 155 can be used by the networked device 110 to identify and collect select data, the select data being identified in accordance with identifiers included in collection object 155. Collection object 155 may also be used by the networked device 110 to create a log of information descriptive of collection operations and events associated with collecting data. The collected data 160, including log information, may be transmitted to data collection subsystem 130, where replicated data 270 may be extracted from the collected data 160 and stored in data store 250. Elements and functions of the exemplary data collection subsystem 130 shown in FIG. 2 will now be described in further detail.

1. Request Interface

Request interface 210 may be configured to receive request-related information and to generate request 260 from the received information. Request interface 210 may perform any preprocessing functions useful for putting the request-related information in usable form. In certain embodiments, request interface 210 includes one or more user interfaces for receiving information from users. The user interfaces may be in the form of graphical user interfaces (e.g., web pages), voice interfaces, or any other interface capable of receiving user input.

Figure 3:
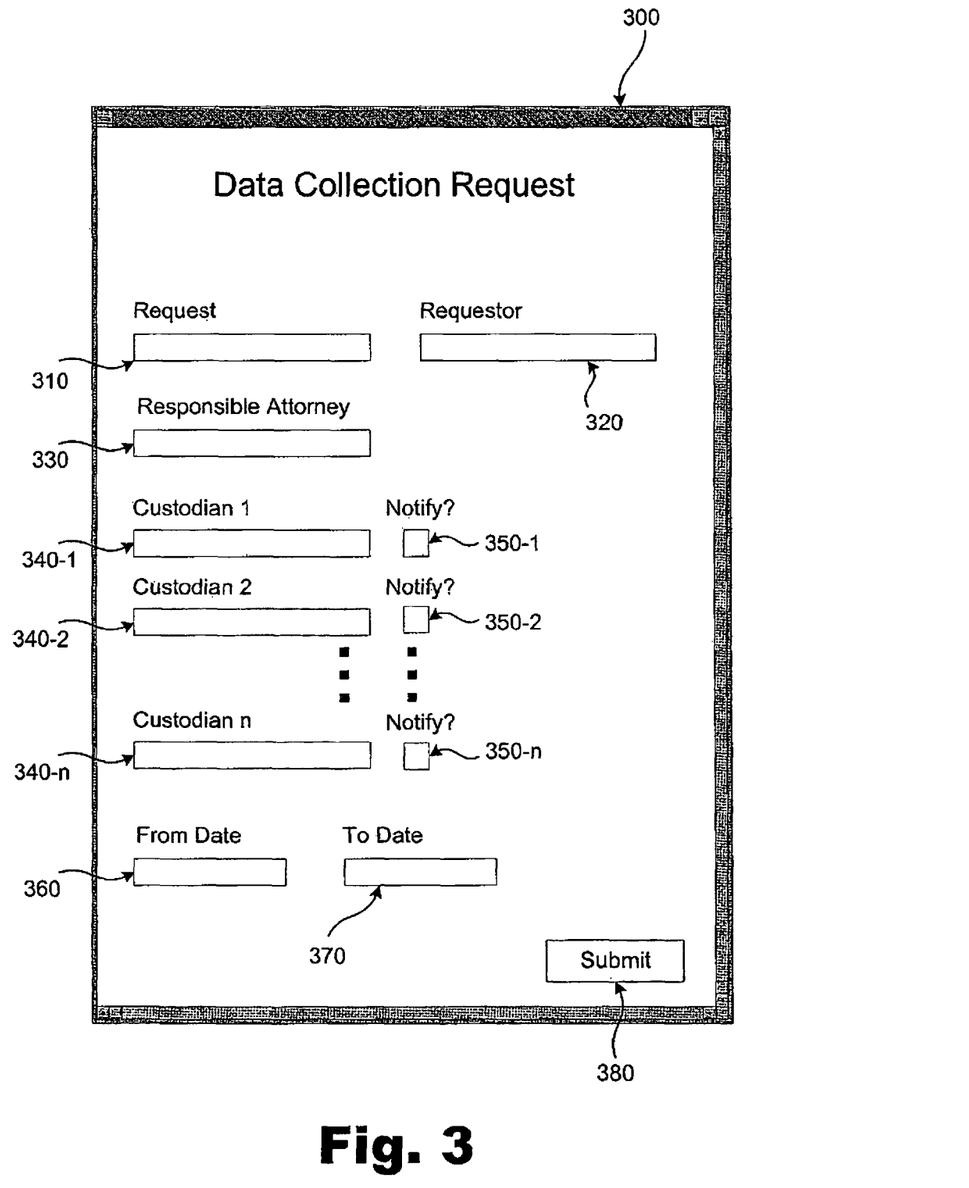
FIG. 3 is an illustration of an exemplary graphical user interface configured to receive request information from a user, according to an embodiment.

FIG. 3 illustrates an exemplary graphical user interface 300 that may be included in request interface 210 to receive user input, according to an embodiment. As shown in FIG. 3, graphical user interface 300 may be configured to receive request information related to electronic discovery requests. In particular, graphical user interface 300 is configured to receive a request identifier in request identifier field 310, a requestor identifier in requestor identifier field 320, a responsible attorney identifier in responsible attorney identifier field 330, custodian (i.e., network users) identifiers in custodian identifier fields 340-1 through 340-n (collectively "custodian identifier fields 340"), notification selections in notification fields 350-1 through 350-n (collectively "notification fields 350"), a beginning date identifier in "from date" field 360, and an ending date identifier in "to date" field 370. A user may submit the request identifiers by selecting submit button 380.

The graphical user interface 300 of FIG. 3 is not intended to be limiting. Other graphical user interfaces may be used in other embodiments to receive request-related information (e.g., identifiers) or other information from users. Of course, other embodiments may employ different mechanisms than those shown in graphical user interface 300 to collect information from a user. For example, fields may be pre-populated with selectable information. An example of this is pre-populating responsible attorney field 330, requestor field 320, and/or any custodian fields 340 with a list of selectable persons (e.g., a list of employees).

Request interface 210 may be configured to receive any information potentially useful for managing requests, or for identifying and collecting data from networked devices 110. Merely by way of example, information that may be received by request interface 210 may include, but is not limited to, username(s) to which a request applies, data content identifiers (e.g., key words or structured content queries), file types (e.g., text files, Microsoft Word files, Microsoft Excel files, Microsoft Power Point files, Adobe Portable Document Format files (.pdf) files, source code, Hypertext Markup Language (HTML), Extensible Markup Language (XML), email archive files, etc.), request descriptions (e.g., a textual description associated with a request, including related background information), request dates, update selections (e.g., to specify that a request is for an update to a previous data collection request), refresh date (e.g., to specify a date on which to automatically update data collection results associated with a request), refresh frequencies (e.g., to specify a time period for automatically updating data collection results associated with a request), notification language (e.g., user-created or sample notification text or attached document file to be sent to custodians), custodian contact information (e.g., e-mail addresses), import files (e.g., import files including batches of custodian identifiers), maximum data storage capacities (e.g., a maximum threshold designed to limit the size of data that may be collected), and any other information that may be used to generate requests, control processing or request, manage requests, identify target data to be collected, and otherwise direct data collection operations.

Any of the above-listed information may be used in any suitable combination as criteria that identify data that is to be collected. As described in more detail further below, for example, custodian identifiers may be used to identify from which networked devices 110 data should be collected. Custodian identifiers may include user names, login names, passwords, or any other information useful for identifying network identifiers and associated network permissions of network users.

Usernames may be used to identify and collect data related to a specific user or users. User data associated with a username may be located on a single networked device 110, certain portions of a networked device 110 (e.g., specific drives or folders), or across multiple networked devices 110. In certain embodiments, system 100 may identify and collect all data associated with one or more usernames (or other identifiers of network users).

In other exemplary embodiments, a subset of user data may be identified and collected. The identified data may include user data that relates to any possible category or categories of recovery. The category or categories may be defined by any of the above-described information received by request interface 210. Examples of such categories may include, but are not limited to, classifications of data by date(s), time(s), ranges of dates or times, content identifiers (e.g., key words), file types, network resources (e.g., specific networked device 110), or any combination or subset of such classifications. Accordingly, system 100 is able to identify and collect certain data using flexible and user-definable criteria, thereby making data collection operations flexible to fit a wide variety of request requirements or preferences.

For example, date identifiers may be provided to limit data collections to a specific range of dates. When both the "from date" field 360 and the "to date" field 370 of FIG. 3 are populated with valid date identifiers, the range will be the period of time within, and including, those dates. When only the "from date" field 360 is populated with a valid date identifier, the range of time to be considered will be from the date specified by the "from date" identifier up until and including the date on which the request is processed (i.e., the date the relevant data is collected). When only the "to date" field 370 is populated with a valid date identifier, the range of time to be considered will be from a date that predates the oldest searchable data on network 150 up until and including the date specified by the "to date" identifier. When neither "from date" field 360 nor "to date" field 370 is populated, no date restrictions will be imposed when scanning for relevant data.

In certain embodiments, the range of dates acts as a global search criterion that is applied for every custodian. In alternative embodiments, however, ranges of dates may be specified for each custodian. In certain embodiments, the date identifiers are compared with modification dates associated with data (e.g., the date of the last modification of a file) to determine whether the data was last modified within the time range specified by the date identifiers. The date fields 360 and 370 allow users to generate requests that are tailored to match time periods specified in discovery requests or other data collection requirements.

Of course, any other identifiers described above may be used in addition to the date identifiers to further restrict data searches. For example, a particular search and collection operation may target data associated with specified usernames, a specific ranges of dates, and files of specified types. For example, a data collection may collect only non-system files that include textual data. Of course, any set of file types may be used as a search criterion. A search may even be restricted to one particular type of file (e.g., Microsoft Power Point files or e-mail files).

In the same manner, a particular search and collection operation may be restricted by any identifier described above, including content identifiers such as key word(s), for example. Accordingly, in certain embodiments, only files or redacted portions of files containing specific content would be collected. This provides yet another way to tailor data collections to satisfy specific preferences or requirements.

Notification selections (e.g., such as those defined in notification selection fields 350) may be used to determine whether to notify custodians of data collection operations. For example, when a user populates notification field 350-1 in the affirmative, the user identified by the custodian identifier entered in custodian identifier field 340-1 will be notified (by e-mail for example) of data collection operations. In certain embodiments, graphical user interface 300 may provide mechanisms for selecting the information that will be provided to a custodian with a notification, as well as whether the custodian will be notified before, during, or after the execution of copying operations related to that custodian. For example, notification text fields may be provided that allow users to create or modify sample notification language that will be sent to custodians. Contact information for custodians may also be received through request interface 210 and used for notifications.

Returning to FIG. 2, in certain embodiments, request interface 210 may be configured to receive request-related information over network 150. For example, a user of networked device 110-1 may input request information via a user interface associated with the networked device 110-1. Data representative of the information may then be transmitted over communication media 140 to data collection subsystem 130, where request interface 210 receives the request-related data.

Regardless of the source of request-related information, request interface 210 uses the information to generate request 260. In certain embodiments, request interface 210 inserts at least a subset of the received information (e.g., identifiers, text descriptions, etc.) in request 260. Request interface 210 is configured to provide request 260 to collection module 220.

Requests may be stored, controlled, and managed. For example, collection module 220 may store request 260 to data store 250, and a user may control and manage the request 260 via request interface 210. User interface 210 may provide any useful mechanisms for controlling processing associated with request 260 For instance, request 260 may be received and stored in data store 250 but not yet processed for data collection. This allows users to postpone processing of requests until complete information is provided, for example, or for any other reason for postponing processing of the requests. Users may initiate processing or previously stored requests through request interface 210.

Request interface 210 may also provide control mechanisms for modifying, deleting, and adding to stored requests. In other words, request interface 210 provides an interface by which users are able to manage requests stored in data store 250. A user may search for a particular stored request by a request name, request description, request date, or some other request identifier. One or more relevant requests may be identified and presented to the user via the request interface 210, and the user may then modify, control, or otherwise manage the request.

Request interface 210 may also act in a reporting capacity. It may allow users to request information on historical requests or provide statistics on system activities, including the status of data collection operations associated with requests. Request interface 210 may also act as a mechanism to report errors or other actively occurring events in system 100 for interactive operation.

2. Request

Request 260 may include any of the request-related information described above (e.g., request identifiers, requestor identifiers, responsible attorney identifiers, custodian identifiers, date identifiers, data type identifiers, and notification identifiers). In certain embodiments, request 260 is in the form of one or more data objects, such as data objects suitable for object-oriented processing. Of course, request 260 may be in any other suitable form. Request interface 210 provides request 260 to collection module 220.

3. Mapping Directory

Mapping directory 230 may include data that maps custodian identifiers (e.g., names of network users) to network resources (e.g., networked devices 110 and/or shared drives on networked devices 110). Accordingly, the data included in mapping directory 230 can be used by collection module 220 to identify network resources associated with custodian identifiers included in request 260.

Mapping directory 230 may include current and or historical mapping data. In certain embodiments, the mapping data is based on network permissions assigned to users Accordingly, for a particular custodian identifier, mapping directory 230 may include data identifying current permissions and/or historical permissions assigned to the network user associated with the custodian identifier. The permissions identify the network resources to which network user has and/or had access. The network resources may be identified by network addresses or network addressable computer and/or drive names, for example.

By storing historical mapping information (e.g. user permissions by date and or time), mapping directory 230 enables collection module 220 to associate accessible network resources to custodian identifiers based on network permissions as they existed at a particular time, on a particular date, or within a range of times or dates. This is especially beneficial in the context of electronic discovery because many discovery requests seek information associated with past date, times, or ranges of dates or times.

Mapping directory 230 may include any device or devices capable of storing mapping data. Any suitable storage configuration may be used. In certain embodiments, for example, mapping directory 230 includes one or more lookup tables. Mapping directory 230 may be separate from or part of data store 250.

4. Data Store

Data store 250 may include one or more data storage mediums, devices, or configurations and may employ any type, form, and combination of storage media known to those skilled in the art, including hard disk drives, read-only memory, caches, databases, optical media, and random access memory. Data store 250 may include any known technologies useful for storing, updating, modifying, accessing, retrieving, and deleting data. Data may be retrieved from data store 250 in any suitable form.

Data store 250 may include any suitable type or form of electronic data representative of or associated with data collection requests (e.g., requests 260), collection objects 155, replications of data retrieved from networked devices 110 (e.g., collected data 160), request logs, collection logs, network resource mappings (e.g., user permissions), and any other data potentially useful for automatically collecting select data from networked devices 110. As discussed in more detail below in reference to FIG. 4, data stored in data store 250 (e.g., replicated data 270) may be organized by request. Other suitable organizational schemes may be used in other embodiments.

In certain embodiments, data store 250 includes cached data (e.g. previous requests 260, collection objects 155, and/or replicated data 270 associated with the previous data collection requests) that may be retrieved by collection module 220 to satisfy, in whole or in part, data collection requests having one or more identifiers in common with previous requests. Caching data for subsequent use helps increase the speed at which data can be retrieved in response to identical or similar requests (e.g., requests having common identifiers identifying overlapping data).

5. Collection Module

As shown in FIG. 2, collection module 220 may be configured to communicate with request interface 210, mapping directory 230, connection module 240, and data store 250. In certain embodiments, collection module 220 is configured to operate request interface 210, including presenting request interface 210 for consideration and use by a user. Collection module 220 may also be configured to receive request 260 from request interface 210. Request 260 may be stored to data store 250 for future access.

Collection module 220 uses data included in request 260 and other data (e.g., data included in mapping directory 230 and/or data stored in data store 250) to generate collection object 155. In certain embodiments, collection module 220 is configured to use identifiers included in request 260 to query mapping directory 230. For example, collection module 220 may use custodian identifiers (e.g., user names) to identify network resources (e.g., networked devices 110) that are accessible to the corresponding network users. Mapping directory 230 provides the network resource identifiers (e.g., networked addresses assigned to networked devices 110) to collection module 220.

In other embodiments, network resources mapped to custodian identifiers may be ascertained from other sources. For example, such information may be stored in data store 250. In another example, collection module 220 may obtain network resource identifiers from network directory 120. In yet another example, collection module 220 may instruct connection module 240 to obtain network resource identifiers from network directory 120, which is especially useful in embodiments in which network 150 includes multiple domains.

Collection module 220 is configured to append the identified network resource identifiers to the corresponding custodian identifiers included in request 260. Collection module 220 may generate collection object 155 to include the identified network resource identifiers, as well as any information included in request 260. Accordingly, collection object 155 includes data identifying which networked devices 110 are to be searched for relevant data.

In certain embodiments, collection module 220 may be configured to query data store 250 for data that will satisfy request 260. In particular, caches of replicated data 270 previously stored in data store 250 may be searched. When a match is found, collection module 220 may retrieve the identified replicated data 270 or may earmark the replicated data 270 for subsequent refreshing (i.e., updating with recently modified data).

Collection module 220 may modify or supplement request 260 or collection object 155 to prevent duplicative data collection operations from being performed. That is, if it is determined that matching cached data exists in data store 250, collection module 220 can modify data collection criteria in request 260 or collection object 155 to avoid recopying the same data. Updated data collection identifiers may be defined and used, and the resulting replicated data 270 may be appended to the matching cached data. Accordingly, the collection object 155 may be configured to instruct networked devices 110 to find and replicate only the data matching original request 260 that is not already stored in data store 250. For example, if a particular request 260 specified a particular custodian, and data store 250 already included data associated with the particular custodian up to a certain date, collection module 220 may modify request 260 or collection object 155 to define a search for data associated with the particular custodian that was modified subsequent to the certain date In this manner, system 100 is capable of reusing previously collected data when possible to minimize data collection operations for overlapping, subsequent collection requests.

When a request is for an update of past collections stored in data store 250, the past collections may be retained in data store 250. The corresponding update collections may be stored separately in data store 250 and may include a link or links to the past collections such that an access to the update collections will identify a complete set of collections, including both the update and the past collections. Alternatively, the corresponding update collections may be stored separately of the past collections, with a copy of the past collections being appended to the corresponding update collections.

As mentioned above, collection module 220 may be configured to generate collection object 155 using information included in request 260 and information retrieved from mapping directory 230, data store 250, and/or network directory 120. Collection object 155 may also include scheduled times for execution of data collection operations. The scheduled times may be obtained from request 260 or generated by collection module 220 based on predefined factors, including, for example, network usage patterns or custodian schedules. Once collection object 155 is generated, collection module 220 provides collection object 155 to connection module 240.

6. Connection Module

Connection module 240 receives collection object 155 from collection module 220. Connection module 240 is configured to communicate with network directory 120 to monitor registration events associated with networked devices 110 identified in collection object 155. Accordingly, connection module 240 is able to determine when identified networked devices 110 are logged on network 150 (i.e., joined a domain of network 150). When it is determined that a target networked device 110 is accessible, connection module 240 establishes a connection between data collection subsystem 130 and the target networked device 110. Connection module 240 may be configured with permissions and other data that will enable access to the networked devices 110.

Once the connection is established, connection module 240 is configured to transmit (i.e., push) collection object 155 to the target networked device 110, and collection object 155 is dropped onto the target networked device 110. As previously described, collection object 155 is configured to be used by target networked device 110 to define and perform data collection operations, examples of which are described further below.

Performance of data collection operations generates collected data 160 on the target networked device 110, as described below. Networked device 110 notifies connection module 240 of the completion of the data collection operations and the location of collected data 160, which may then be transmitted from target networked device 110 to data collection subsystem 130. Connection module 240 may process the collected data 160 before storing it to data store 250. In certain embodiments, for example, connection module 240 is configured to decompress and decode (e.g., extract or unzip) replicated data 270 included in collected data 160

Figure 4:
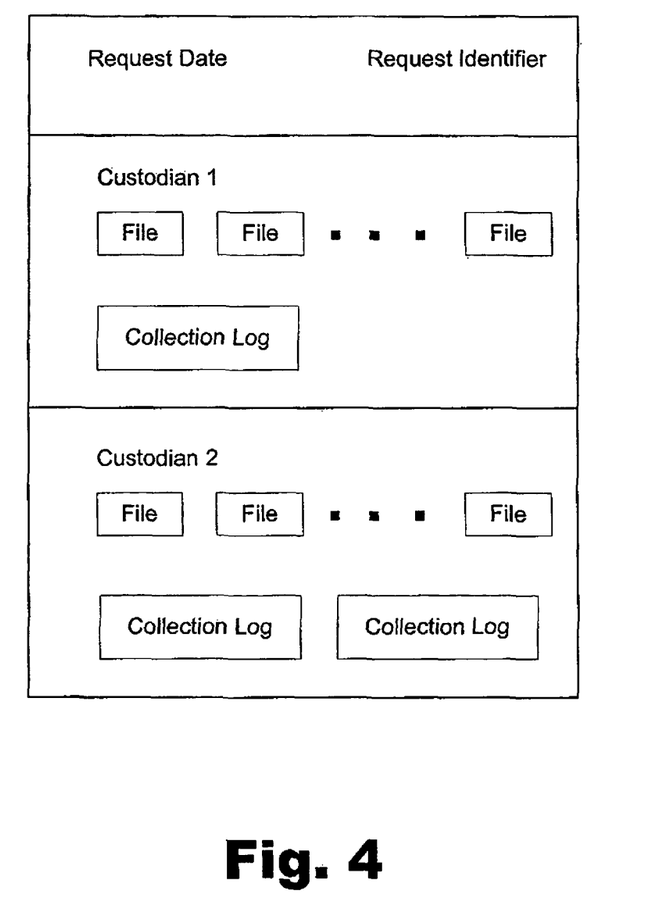
FIG. 4 is an illustration of an example of collected data, including exemplary collection log data, according to an embodiment.

Replicated data 270 may be stored to data store 250 in any suitable manner and form. Replicated data 270 may be organized in any suitable manner. An example of replicated data 270 is illustrated in FIG. 4, which will be described further below.

Connection module 240 may include known software applications, including remote administration tools. For example, connection module 240 may include Microsoft Windows® Server remote administration tools, Marimba® remote administration tools provided by BMC Software—Marimba Product Line of Mountain View, Calif., Tivoli® software provided by International Business Machines Corporation of Armonk, N.Y., Microsoft® System Management Server (SMS) tools from Microsoft Corporation of Redmond, Wash., Hewlett Packard management software such as OpenView® by Hewlett Packard of Palo Alto, Calif., and Unicenter® operations management solutions provided by Computer Associates International, Inc. of Islandia, N.Y. Other embodiments may use other suitable remote administration tools capable of monitoring logon events, establishing remote connections with networked devices 110, pushing objects to networked devices 110, retrieving data from networked devices 110, and tearing down remote connections with networked devices 110.

7. Data Collection Operations

As mentioned above, collection object 155 may include one or more objects capable of being dropped on networked devices 110. Once successfully placed on a networked device 110, collection object 155 is configured for use by the networked device 110 in performing data collection operations. In certain embodiments, collection object 155 includes identifiers provided in request 260, which identifiers are used by an executable running on the networked device 110 to define parameters used to perform data collection operations.

The networked device 110 and any shared network drives mapped on the network device 110 are scanned for data satisfying the parameters included in collection object 155. For example, collection object 155 may specify a particular range of dates and particular types of files, as described above. In this case, the networked device 110 is scanned to identify files of the specified type(s) that were modified within the specified range of dates. Network resource identifiers included in collection object 155 may be used to verify that the correct networked device 110, or the correct shared network drive mapped on the networked device 110, is targeted for scanning. The executable may utilize known software tools capable of scanning computer storage media, including any such tools already operating on networked device 110.

Data identified by scanning networked device 100 may be replicated. Preferably, an exact replication of the identified data is generated. An exact replication, as used herein, refers to a replication that has the same content and metadata as the original data. An exact replication can also include any encoded or compressed replications that can be decoded and extracted in a manner that produces a replication that has the same content and metadata as the original data.

In certain embodiments, identified data is replicated by encapsulating it in one or more data structures to form collected data 160 on the networked device 110. For example, identified files may be bit streamed from their locations on networked device 110 to generate encoded replications of the files. The encoded replications are encapsulated in an encoded archive, such as a zip file, for example, in a manner that preserves the original metadata and content. In many embodiments, the encoding of the data also serves to compress the data in size to minimize transmission loads. Known zip tools or other tools capable of encoding and/or packaging data while preserving content and metadata may be employed for replicating data by encapsulation. By replicating data and preserving the associated original metadata and content, system 100 provides data collection operations that comply with discovery requirements (e.g., legal requirements that unaltered data be collected).

Once instantiated on the networked device 110, the collected data 160 may be transmitted to data collection subsystem 130. Collection object 155 may include information useful by the networked device 110 for transmitting the collected data 160, including, for example, a network address to which the collected data 160 should be sent.

After a copy of the collected data 160 is successfully transmitted from the networked device 110 to data collection subsystem 130, networked device 110 may be instructed to delete the local copy of the collected data 160. A data collection executable may be maintained on the networked device 110 for use by future data collection requests.

Connection module 240 receives the collected data 160 from network device 110. Connection module 240 may be configured to perform any processing of the collected data 160 helpful for storage, extraction, notification, verification, and error checking purposes. In certain embodiments, connection module 240 decodes and extracts replicated data 270 from collected data 160 (e.g., from an encapsulation such as a zip file). The extracted replication data 270 is preferably an exact replication of the data collected from networked device 110.

Connection module 240 may be configured to store the extracted replication data 270 to data store 250. The data may be stored in any suitable form and configuration. In certain embodiments, the replication data 270 for each custodian associated with a request is aggregated for storage.

An example of data for a particular request, as stored in data store 250, is illustrated in FIG. 4. As shown in FIG. 4, data may be organized by request. In the embodiment of FIG. 4, each request is indexed by request date and identifier. Within each instance of request data, data is indexed by custodian identifier, with each instance of custodian data including the replicated data 270 (e.g., files) collected from network resources accessible by the custodian.

As further shown in FIG. 4, one or more collection logs are indexed within each instance of custodian data. A collection log may be generated for data collected for each custodian or from each networked device 110. Thus, in certain embodiments, if a custodian is associated with more than one networked device 110, multiple collection logs may be associated with that custodian.

The collection object 155 may be configured to instruct networked device 110 to create one or more collection logs including data descriptive of data collection events and operations performed on the networked device 110. Information included in such a log may include, but is not limited to, dates and times associated with each remote access of networked device 110, dates and times associated with creation of replications of data (e.g., dates and times associated with creation zip files including replicated files), request identifiers, requestor identifiers, responsible attorney identifiers, any other identifiers included in collection object 155, searches performed on networked device 110, search criteria used for the searches, results of the searches, metadata associated with identified data (e.g., file names, creation dates, modify dates, sizes, etc.), commands executed to encapsulate data, times data transmissions began, times data transmissions ended, aggregate size of data collected, and any errors associated with access or with collection operations and events. Any relevant data collection event may be included in the generated logs.

Collection logs may be transmitted to data collection subsystem 130 over network 150 either together with collected data 160 (e.g., included in collected data 160) or separate from collected data 160. In certain embodiments, a log file is created for data collection operations associated with collection object 155, and the log file is encapsulated in an encapsulation of replicated data (e.g., the same zip file including the replicated data) for transmission to data collection subsystem 130.

A copy of a collection log may be maintained on the corresponding networked device 110 for use by future data collection requests. In particular, collection update and refresh requests can examine the collection log to determine the date of the last data collection activity. Any data having a modification date later than the date of the last data collection activity can then be collected in any of the ways described above to update or refresh a previous collection of data.

Collection logs may be stored in data store 250 with collected data as shown in FIG. 4, or in a separate data store (not shown). Collection logs can be used as evidence to certify that data collection operations and results comply with discovery requests (e.g., by including appropriate search criteria or by not altering collected metadata).

Request and notification logs may also be generated and stored in data store 250. Request logs may include any information associated with the creation, modification, processing, and completion of requests. Notification logs may include any status or error notifications associated with data collection operations Notification logs may also include information associated with notifications sent to custodians. For example, a return receipt mechanism may be used to produce log entries for notification e-mail messages sent to custodians.

The above-described logs are useful as reliable records of events associated with data collection operations. Accordingly, the logs may be valuable for proving satisfaction of request requirements (e.g., legal requirements associated with discovery requests).

Status notifications may be included in system 100. In certain embodiments, system 100 is configured to generate and transmit status messages informing predetermined persons (e.g., principal persons listed in the corresponding request such as a requestor, network administrator, and responsible attorney) of the reaching of predefined milestones in processing data collection requests. The messages may be in the form of e-mail messages sent to a predetermined list of e-mail addresses Notifications may report statistics for volumes of requests. For example, a notification may indicate the percentage of completion of data collection for a request or a group of requests.

Status notifications may also be sent when predefined events are encountered. For example, if a mapped network drive exceeds a maximum threshold (which may be predefined or provided by a user via request interface 210), notifications of this event may be sent to the predetermined persons. Such an event may also be inserted in the associated collection log. The notification and/or the log may include information helpful for identifying the request and networked device associated with the event, including the associated request identifier, custodian identifier, networked device address, shared drive mapping, and share size. Of course, if the size of the shared drive is less than the predefined maximum threshold, collection operations continue as described above.

By way of another example, status notifications may be sent when processing of a particular request 260, or for a particular custodian, has been completed. System 100 may report completions of data collections by e-mail. Such notifications may include any information associated with the fulfillment of the request 260, including networked device identifiers, custodian identifiers, request identifiers completion time, and aggregate size of the data collected.

Error handling may be included in system 100. In certain embodiments, system 100 is configured to isolate encountered errors, collect information relevant to the errors, and report the error and relevant information to predetermined persons (e.g., principal persons listed in the corresponding request such as network administrator, requestor, and responsible attorney). For example, error notifications may be sent (e.g., by e-mail) to a predefined list of addresses whenever an error occurs Error messages may include any information helpful for analyzing and resolving errors, including, for example, networked device identifiers, custodian identifiers, error details, and connection details.

An example of an error that may be identified by system 100 relates to the amount of available storage space on networked devices 110. Before replicating identified data on a networked device 110 as described above, for example, the available memory capacity of the networked device 110 may be determined to assure that sufficient space exists to create an encapsulation file (e.g., a zip file). This may include comparing the amount of available space on the networked device 110 with a predetermined threshold. If it is determined that insufficient space is available, an error message may be generated and sent to a predefined list of persons.

III. Exemplary Process View

Figure 5:
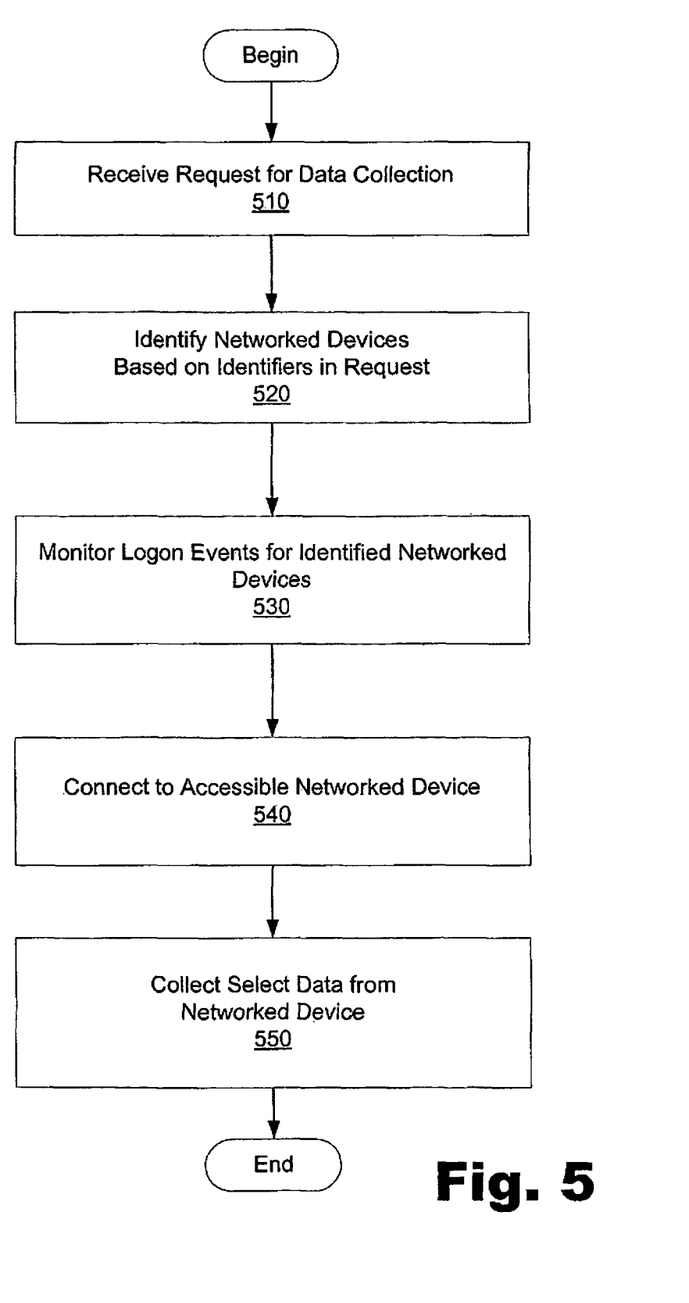
FIG. 5 is a flowchart illustrating an exemplary data collection process, according to an embodiment.

FIG. 5 illustrates an exemplary data collection process, according to an embodiment. While FIG. 5 illustrates exemplary steps according to one embodiment, other embodiments may omit, add to, and/or modify any of the steps shown in FIG. 5.

In step 510, a data collection request (e.g., request 260) is received. The request may include any data (e.g., identifiers) described above and may be received by collection subsystem 110 as described above.

In step 520, networked devices (e.g., one or more networked devices 110) are identified based on identifiers included in the request. This step may be performed in any of the ways described above, including accessing mapping directory 230 to determine networked devices and mapped to users represented by custodian identifiers included in the request.

In step 530, logon events are monitored for the identified a networked devices This step may be performed in any of the ways described above, including connection module 240 monitoring logon events maintained by networked directory 120

Once it is determined in step 530 that one of the networked devices is accessible, a connection is established with the networked device in step 540. Step 540 may be performed in any of the ways described above, including connection module 240 establishing a connection over network 150 with the identified networked device (e.g., networked device 110-1).

Figure 6:
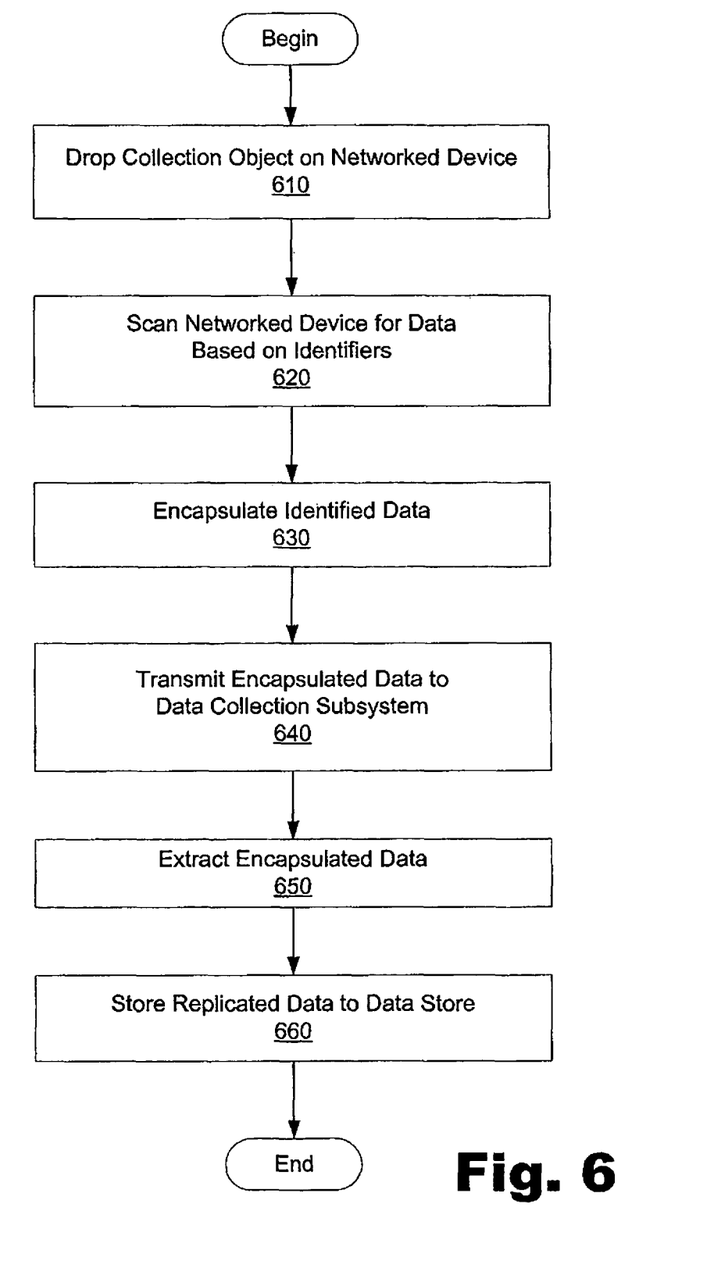
FIG. 6 is a flowchart illustrating exemplary data replication operations used in the process of FIG. 5, according to an embodiment.

In step 550, select data is collected from the networked device. This step may be performed in accordance with the exemplary data replication process illustrated in FIG. 6. While FIG. 6 illustrates exemplary steps according to one embodiment, other embodiments may omit, add to, and/or modify any of the steps shown in FIG. 6.

In step 610, a collection object (e.g., collection object 155) is dropped on the networked device. The collection object may include any of the data and be in any of the forms described above. In certain embodiments, for example, collection object includes one or more configuration files having request identifiers included therein. As described above, the identifiers can be used to define data collection operations, including search parameters used to identify relevant data on the networked device. For a first-time data collection on a particular networked device, the collection object may also include one or more executables having instructions stored thereon for instructing the networked device to perform steps 620 through 640 in accordance with the identifiers included in the accompanying configuration files.

In step 620, the networked device is scanned for relevant data based on the identifiers included in the collection object. This step may be performed in any of the ways described above, including searching for files of certain types and having modification dates within a certain time period.

In step 630, the identified data is encapsulated in one or more data structures. This step may be performed in any of the ways described above, including encapsulating identified files in a zip file or other form of data structure. Step 630 should be performed in a manner that protects the integrity of the original files and the integrity of the encoded representations of the files being encapsulated. In general, step 630 is performed in a manner that preserves the original content and metadata of the files being encapsulated.

In step 640, the encapsulated data is transmitted from the networked device to data collection subsystem 130. This step may be performed in any of the ways described above. Typically, step 640 includes transmitting a copy of the encapsulated data over network 150.

In step 650, the encapsulated data is extracted. This step may be performed in any of the ways described above, including connection module 240 extracting files from one or more zip archives or other forms of encapsulations. Preferably, step 650 is performed in a manner that prevents alteration of file content and metadata. Accordingly, the extracted data can be an exact replication of the original data collected from the networked device. Step 650 is optional and can be directed from data included in the request Accordingly, encapsulated data can be extracted or left in an encapsulated form (e.g., zip format) for downstream activities.

In step 660, the replicated data is stored to data store 250. The replicated data may be stored in any of the ways, forms, or configurations described above. As previously described, the stored data may include a collection log including data descriptive of the data collection operations performed on the networked device. Accordingly, data store 250 can include data that is certifiably responsive to a request, including discovery requests having very specific criteria.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. For example, although certain embodiments described herein were presented in the context of responding to electronic discovery requests related to litigation or a subpoena, the systems and methods described herein may be used to automatically collect data over a network for other applications. It is intended that the scope of the invention be defined by the following claims

What is claimed is:

1. A system comprising:
a data collection subsystem communicatively coupled to at least one networked device via a network, said data collection subsystem being configured to:
receive a data collection request that includes a custodian identifier and a data content identifier, the custodian identifier being associated with at least one user,
identify a networked device based on the custodian identifier by utilizing a mapping directory that maps the custodian identifier to at least one network resource associated with the at least one networked device,
instruct the identified networked device to search for data using the data content identifier, and
automatically collect an unaltered replication of the identified data from the identified networked device via the network, said unaltered replication of the data being encapsulated and transmitted from the at least one networked device to said data collection subsystem via the network;
wherein said data collection subsystem is configured to automatically collect said unaltered replication of the data by:
generating a collection object based on said data collection request; and
dropping said collection object on the identified networked device, said collection object being configured to direct the identified networked device to:
scan at least a portion of the identified networked device for the data,
encapsulate said unaltered replication of the data, and
transmit said encapsulated data to said data collection subsystem; and
wherein said collection object is further configured to direct the identified networked device to:
generate a collection log including information descriptive of events associated with said automatic collection of said unaltered replication of the data, wherein said information included in said collection log includes first metadata associated with the data on the networked device and second metadata associated with said unaltered replication of the data; and
transmit said collection log to said data collection subsystem.

2. The system of claim 1, wherein said unaltered replication of the data includes an unaltered replication of metadata associated with the data.

3. The system of claim 1, wherein said encapsulation of said unaltered replication comprises a data structure configured to be processed as a single entity.

4. The system of claim 1, wherein said encapsulation of said unaltered replication comprises a compression utility.

5. The system of claim 1, wherein said information included in said collection log is indicative of compliance of said automatic collection with said request.

6. The system of claim 1, wherein said information included in said collection log includes at least one criterion used to scan the at least a portion of the networked device.

7. The system of claim 1, wherein said information included in said collection log includes at least one command used to encapsulate said unaltered replication.

8. The system of claim 1, wherein said data collection request also includes at least one of a date identifier, a date range identifier, a content identifier, and a file type identifier.

9. The system of claim 1, wherein said data collection request is for an update to a past data collection.

10. The system of claim 1, wherein said request includes a schedule identifying one or more times to perform said automatic collection.

11. The system of claim 1, further comprising a request interface configured to receive request information from a user and to generate said data collection request based on said request information, said request information being representative of at least one requirement associated with a litigation-related discovery request or a subpoena.

12. The system of claim 11, wherein said request interface is configured to provide a report associated with a status of said automatic collection.

13. The system of claim 1, wherein said data collection subsystem is configured to send a notification message to a user associated with the identified networked device prior to automatically collecting said unaltered replication of the data from the identified networked device.

14. The system of claim 13, wherein said data collection subsystem is configured to generate a notification log, said notification log including information associated with the sending of said notification message and with receipt of a reply to said notification message.

15. The system of claim 1, wherein the mapping directory maps the custodian identifier to at least one network resource based at least in part on the user's access permissions.

16. The system of claim 1, wherein the mapping directory maps the custodian identifier to at least one network resource based at least in part on the user's access permissions as they existed during a specified time period.

* * * * *